United States Patent [19]
Foufounis

[11] 3,747,324
[45] July 24, 1973

[54] CHRONOGRAPH

[76] Inventor: Jean Foufounis, 32, avenue du Leman, Lausanni, Switzerland

[22] Filed: May 18, 1971

[21] Appl. No.: 144,491

[30] Foreign Application Priority Data
Apr. 6, 1970 Switzerland.......................... 8517/70

[52] U.S. Cl. ............................................. 58/126 R
[51] Int. Cl. ............................................. G04b 19/00
[58] Field of Search ...................... 58/126 R, 126 B, 58/91, 152 F, 152 G, 57, 74; 235/61 NV

[56] References Cited
UNITED STATES PATENTS

| | | | |
|---|---|---|---|
| 1,160,110 | 11/1915 | Mays................................. | 58/126 R |
| 234,863 | 11/1880 | Farnsworth........................ | 58/152 G |
| 2,282,209 | 5/1942 | Pepper, Jr. et al. ............... | 58/152 G |
| 2,334,287 | 11/1943 | Reece .............................. | 235/61 NV |
| 2,361,563 | 10/1944 | Pellaton.................................. | 58/57 |
| 2,892,304 | 6/1959 | Eaves................................ | 58/152 G |
| 3,124,928 | 3/1964 | Brunet ..................................... | 58/57 |
| R26,041 | 6/1966 | Fallis.............................. | 235/61 NV |

FOREIGN PATENTS OR APPLICATIONS

| | | | |
|---|---|---|---|
| 348,368 | 9/1960 | Switzerland....................... | 58/152 G |
| 1,417,509 | 10/1965 | France..................................... | 58/57 |
| 504,481 | 4/1939 | Great Britain ......................... | 58/57 |
| 308,601 | 10/1955 | Switzerland....................... | 58/152 G |

*Primary Examiner*—Richard B. Wilkinson
*Assistant Examiner*—Stanley A. Wal
*Attorney*—Young & Thompson

[57] ABSTRACT

A chronograph comprising a minute indicator member, a normal fixed dial which is graduated in minutes, two circular rotary elements which are coaxial with said indicator member and which each have a zero index and a minute graduation which on one of the said elements is retrogressive whereas on the other it is progressive.

2 Claims, 1 Drawing Figure

PATENTED JUL 24 1973 3,747,324
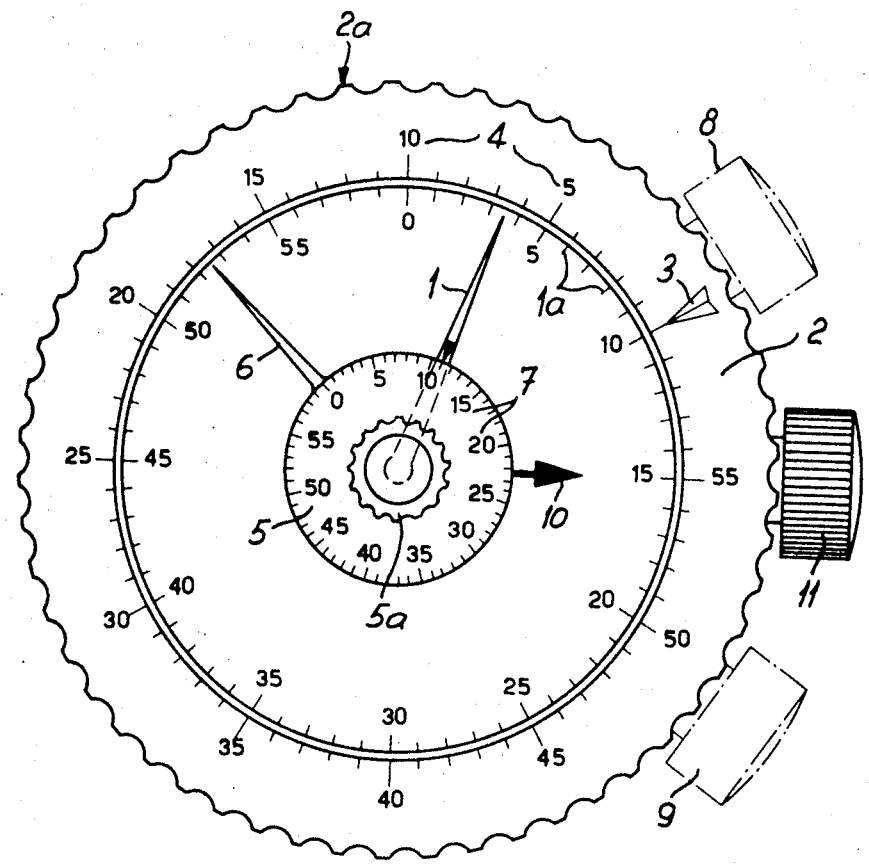
INVENTOR
JEAN FOUFOUNIS
BY Young + Thompson
ATTYS.

CHRONOGRAPH

The subject of the present invention is a chronograph which gives at any moment and by direct reading:
1. the time of a previous event;
2. the time selected or estimated for an event subsequent to the present moment;
3. the time elapsed since the previous event;
4. the time remaining up to the subsequent event.

The present known chronographs do not permit direct reading of the above indicated elements, and oblige the person using the chronograph to make mental calculations and take manuscript notes. The chronograph according to the invention which comprises a minute indicator, overcomes these disadvantages. It is characterised in that it also comprises a normal fixed dial which is graduated in minutes, two circular rotary elements (rim or disc) which are co-axial with said indicator member and which each have a zero index and a minute graduation which on one of the said elements is retrogressive whereas on the other of said elements it is progressive.

The accompanying drawing shows by way of example in a single FIGURE in plan view, a chronograph according to the invention.

To illustrate the use of the chronograph according to the invention, the case of aerial navigation has been selected by way of example. In this case, the chronograph gives at any moment and by direct reading:
1. the exact time of passage of the aircraft over the previous beacon;
2. the estimated time of the aircraft passing over the next beacon;
3. the precise number of minutes which have elapsed since passing over the previous beacon;
4. the number of minutes necessary to arrive at the following beacon;
5. the position of the aircraft on the portion of the route between the previous beacon and the following beacon.

It is obvious however that the chronograph can be used for any sort of measurement of time in minutes, whether for a diver, a motorist, a manufacturer, a chemist, a cook, an aviator, etc.

The chronograph as illustrated comprises a minute indicator member 1, a rotary rim 2 which has a zero index 3 and a retrogressive minute graduation 4.

In this embodiment, the chronograph also comprises a central rotary disc 5 carrying a zero index 6 and a normal minute graduation (in increasing order). The rim 2 can be moved manually either by way of its notched periphery 2a or by a knurled button 9 in any conventional manner.

The disc 5 of which the index 6 is to be placed in superposition with the minute hand 1 (time check) each time the beacon is passed, can be moved either in a similar manner by the button 8 that is, conventionally, or, as shown in the embodiment in the drawing, by a knurled button 5a which projects from the chronograph protective glass.

The disc 5 could also be displaced until its index 6 is superposed on the minute hand 1 by an elastic system called a "catch-up hand" system, which is well known to the man skilled in the art and hence need not be further illustrated, in which case an axial pressure applied to the button 8 would free the disc 5, the index 6 of which would move to "catch-up" the minute hand 1 and would be locked in this position until a fresh pressure is applied to the button 8.

The chronograph can also comprise an hour hand 10; the two hands 1 and 10 giving the complete time can be moved by re-setting to the time, as known, by the winding wheel 11 of the chronograph.

The chronograph operates in the following manner:

Before taking off, the user of the chronograph employs the wheel 11 to set the hand 1 to the precise minute given by the control tower, for example 3½ minutes after the hour. If the chronograph has an hour hand 10, the user sets the chronograph to the precise hour, for example 3 hours, 3½ minutes.

After take-off, and when the aircraft passes over a first beacon, the user of the chronograph sets the index 6 of the ring (or plate) 5 just above the minute hand 1.

This operation is called "time check" and makes it possible to keep a record of the precise time at which the aircraft passed over the beacon.

Immediately after this operation, the user turns the rim 2 so as to bring opposite the same index 6 the graduation representing the estimated flight time for covering the distance between the beacon which the aircraft has just passed and the next beacon.

To carry on with the example of the FIGURE, let us suppose that the aircraft has passed over the first beacon at 52½ minutes after the hour, and that the estimated flight time between the two beacons is 17½ minutes. It is then clearly seen that the index 3 of the rim 2 then shows in direct reading that the aircraft is estimated to pass over the next beacon at 10 minutes after the hour.

In fact, 52½ + 17½ = 70 − 60 = 10.

Each time the aircraft passes over a beacon, the user of the chronograph will proceed in the same manner, possibly correcting his future vectorial estimates according to the real ground speed of the aircraft, which is established on the preceding section of the flight and which varies according to the effective wind.

Returning to the embodiment shown in the FIGURE, it will also be seen that at any moment, and in direct reading, the user can:

a. read from the graduation 7 of the disc 5 the number of minutes elapsed since the aircraft passed over the preceding beacon (11 minutes in the embodiment as illustrated);

b. read from the graduation 4 of the external rim, the estimated time in minutes before the aircraft will reach the following beacon (6½ minutes in the drawing). The total of these two figures does in fact represent the 17½ minutes corresponding to the estimated flight time between the two beacons;

c. read directly the estimated time at which the aircraft will pass over the next beacon;

d. render visible at any moment the position of the aircraft (the point of the minute indicator member) between the previous beacon and the following beacon (the "zero" indices of the two rotary elements respectively locating the two beacons in question).

The illustrated form of the chronograph could be different. For example, it could be in the form of a wristwatch, or could be fixed to a conventional navigation board, or it could also be provided with a plate for fixing to a fascia-board or on the "stick" or "control-wheel" of an aircraft, in this case the wheels and buttons if provided could be fixed so as to extend from the said plate.

I claim:

1. A chronograph for air navigation having a normal fixed dial graduated in minutes, a minute-indicating member chronometrically movable over said dial to indicate elapsed time, two rotatable circular elements coaxial with said dial and each having a zero index, one of said elements having a minute graduation that is progressive thereabout, and the other of said elements having a minute graduation that is retrogressive thereabout.

2. A chronograph as claimed in claim 1, and a push button controlling a catch-up device, the action of said push button permitting the zero index of the rotatable element carrying the progressive minute graduation to catch up the minute-indicator member, the liberation of said push button blocking said element.

* * * * *